United States Patent Office 3,492,252
Patented Jan. 27, 1970

3,492,252
EMULSION COATING COMPRISING NEUTRALIZED LATEX OF ACIDIC POLYMER AND AN EPOXY COMPONENT
Everett B. Euchner, Avon Lake, and Harry J. Kiefer, Jr., Cleveland, Ohio, assignors, by mesne assignments, to SCM Corporation, New York, N.Y., a corporation of New York
No Drawing. Continuation-in-part of application Ser. No. 81,685, Jan. 10, 1961. This application Oct. 7, 1963, Ser. No. 314,549
Int. Cl. C09d 5/02, 3/80, 3/58
U.S. Cl. 260—8                              8 Claims

ABSTRACT OF THE DISCLOSURE

A latex coating composition comprising an acidic emulsion polymerized latex-borne copolymer of defined mixed water insoluble unsaturated monomers, a water soluble monomer (e.g. acrylamide) and defined monomeric di-epoxides of cyclo-aliphatic esters, the composition having epoxy groups and carboxyl groups in a molar ratio between about 0.5 and 1.5 are described. Also described is a method for preparing these compositions.

The invention is advantageous in that the films can be sprayed or dipped to provide coatings possessing excellent durability, adhesion, and flexibility.

---

This invention relates to emulsion coating compositions some of which are capable of depositing films which cure to a glossy condition, and relates more especially to coating compositions which are adapted for application by spraying. The invention relates more particularly to coating compositions having the foregoing attributes and which in addition yield cured films having good exterior durability, good can-coating process-resistance, and protective qualities.

This application is a continuation-in-part of copending applications Ser. No. 81,685, filed Jan. 10, 1961 and Ser. No. 149,176 filed Nov. 1, 1961, both now abandoned.

The present invention is based on a film-forming system involving an acidic polymer and a compatible monomeric or low-molecular-weight-polymeric epoxy component, with or without added water-soluble film-forming products which possess humectant and cross-linking qualities. In the binary combinations of polymer and epoxy component, the latter is preferably selected so as to be emulsifiable while yet having the more important attribute of being entirely compatible with the acidic polymer in the cross-linked film thereby to yield by preference a cured film having high gloss. In applying an emulsion of said binary combination by spraying, various application difficulties frequently arise, and it has hence been found desirable in such instances to overcome these difficulties by including the above-mentioned water-soluble film-forming product. When an emulsion of the binary combination is applied in ways other than by spraying (e.g. by dipping) the said difficulties are not encountered, and hence such an emulsion need not be modified with said water-soluble products except for securing desired film-quality modifications afforded by the latter.

Accordingly, one object of the present invention is to provide an emulsion coating composition whose principal film-forming component is a binary combination of an acidic polymer and a compatible monomeric diepoxide and/or low-molecular weight polymeric epoxide.

Another object is to provide an emulsion composition as last described which is especially adapted for spray application and which involves a film-forming component composed principally of said binary combination plus minor amounts of water-soluble, film-forming products having humectant and/or cross-linking qualities.

A further object is to provide emulsion coating compositions which can be applied in any of the conventional ways, and whose applied films can subsequently be cured to glossy coatings having good protective qualities and good exterior durability.

The foregoing objects and other ancillary thereto will be understood more fully from the following detailed description of our inventions.

In brief, our acidic polymer referred to above is a carbopolymerized latex product secured by emulsion polymerization and chemical carbon-carbon addition of vinylic and equivalently-reactive, unsaturated monomeric materials identified below. One class of said materials consists of 1–30% by weight (based on total monomers) of unsaturated carboxylic acids having up to 10 carbon atoms, such as maleic, itaconic, acrylic, methacrylic, crotonic, etc. Another class of said monomeric materials consists of 10–60% by weight of plasticizing esters having terminal methylene groups such as 4–12 carbon acyl esters of vinyl alcohol, 4–15 carbon alkyl acrylates, 5–15 carbon alkyl methacrylates, cyanoalkyl acrylates, acrylamide, N,N-dialkyl acrylamides, etc. A third class of monomeric materials consists of 25–90%, more preferably 25–60%, of polymerizable hardness-conferring monomers having terminal methylene groups, such as styrene, vinyl acetate, vinyl halide(s), vinylidene halide(s), vinyl toluene, methyl methacrylate, and other lower (1–4 C) alkyl methacrylates. Alpha, beta olefinically unsaturated nitriles can also be used in amounts up to 50% of the total monomers by weight on an optional basis.

Binary and ternary polymers made from such materials are known in the art, but for our present purposes the polymers must be formulated rather carefully to provide an amount of esterifiable carboxyl groups corresponding to 1–30% by weight, preferably 3–15% of acidic monomers. That is, the esterifiable carboxyl groups are provided by acidic monomers which, in the finished polymer, amount to about 1–30 wt. percent. This range of acid content is needed especially to render the binary combination of acidic polymer and selected epoxy component intercompatible in the cured film and hence capable of forming glossy films. Where high gloss is not required, cured intercompatibility need not be secured.

The components of our binary combination can be easily and stably emulsified, and the resulting emulsion films, whether pigmented or not, are easily cured by heating. There results glossy or non-glossy coatings possessing excellent exterior durability as shown by adhesion, humidity, weatherometer, salt spray and other conventional durability tests. The coatings are particularly useful as protective films on ferrous and other metal substrates which have been prime-coated (i.e., coated with a coating carrying priming pigments). However, they can be applied for protective purposes to any other substrates which can tolerate the temperatures needed to cure the films of the binary combination, which range from about 200° F. to 400° F. The emulsions of the binary combination can be applied to substrates by any conventional methods other than spraying. Where spray application is to be used, then our ternary combination described briefly above and described more fully hereinafter is preferred. The various components of our coating compositions will now be described in detail under their separate headings.

THE EPOXY COMPONENT

Our monomeric diepoxides are one or more of the known compounds recently patented in the United States (U.S. Patent No. 2,716,123), and can be described as being diepoxides of cycloaliphatic esters represented by the general formula:

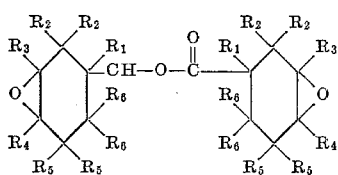

wherein $R_1$ through $R_6$ represents the same and/or different members selected from the group consisting of hydrogen and 1–6 C lower alkyl radicals. Such carboxylate diepoxides are used in a total amount between about 1–20% by weight based on the weight of the acidic polymer, and within this range need not be proportioned so as to achieve stoichiometric equivalency between epoxy groups and carboxyl groups. "EP–201" is a commercial diepoxide whose structure corresponds to the above general formula and is, more specifically 3,4-epoxy-2-methyl-cyclohexyl methyl 3,4 - epoxy - methylcyclohexane carboxylate; mol. wt. 280.4.

As will be understood, our primary objective has been to prepare a stable, commercially-useful emulsion coating for exterior use by combining an acidic polymer of the type described above with, for example, a monomeric diepoxide of the type represented by the general formula, supra, the latter having been selected because it had been found by us to become fully compatible with the acidic polymer (at the said appropriate level of combined acid in the latter) when the combination has been cured, and because we found it could be emulsified stably in an alkaline, oil-in-water type emulsions. Most other di- and/or higher epoxides which we have investigated have been found to be unsuitable by failure to possess one or the other or both of these qualities, although a few low-molecular-weight polymeric epoxides, i.e. those having a softening point up to 212° F., can be employed if suitable adjustment is made in the amount of esterifiable carboxyl groups in the acidic polymer.

It will be understood that a diepoxide (or low-molecular-weight-polymeric polyether epoxide) is wanted under the principles applying to this invention since it provides polyfunctionality in its ability to form ester linkages with carboxyl groups of the acidic polymer, and thereby affords good cross-linking and thermo-setting qualities in the films of the binary combination. Such cross-linking also brings about the full intercompatibility which is necessary to develop high gloss in the cured films. We are aware that the acidic polymers of the types here employed have been combined with polyepoxides such as bisphenol-epichlorhydrin condensation products, and that such combinations have been cured to tough, hard products. However, such higher polyepoxides hydrolyze and undergo premature curing reactions in an aqueous emulsion, and hence lead to impaired shelf-like, ultimate instability and then breakdown of the emulsion. Moreover, it has been difficult to find any of such higher polyepoxides which can be cured easily by reaction with carboxyls and thereby made sufficiently compatible with the acidic polymer to produce the high gloss which is needed in an enamel type film. However, the liquid epoxy-hydroxy polyether polymers of bisphenol and epichlorhydrin, e.g. p,p'-dihydroxy diphenyl dimethyl methane which have relatively low molecular weight (i.e. those having epoxy equivalent weights above about 1 but below about 200) have been found to be stable in our emulsions and to be sufficiently reactive in the baking treatment to provide good cross-linking and intercompatibility with the acidic polymer. The disclosures of the following patents relating to bisphenol/epichlorhydrin resins are here incorporated by reference: 2,582,985, 2,591,539, 2,615,607, 2,615,008, and 2,633,458.

THE ACIDIC POLYMER

The following kinds and proportions of acidic and substantially-neutral materials can be used in preparing the acidic polymer of our binary and/or ternary combinations:

Unsaturated carboxylic acids

Proportions: 3–30% by weight, based on the weight of the finished polymer.

Kinds:
  crotonic acid;
  acrylic acid;
  methacrylic acid and/or polymethacrylic acid;
  ethacrylic acid;
  other substituted acrylic acids wherein the hydrocarbyl substituents contain from 1 to 8 carbons and are aliphatic, cycloaliphatic and/or aromatic in structure;
  maleic acid or anhydride;
  fumaric acid;
  itaconic acid;
  combinations of the above acids in any ratios.

Copolymerizable monomers conferring hardness or plasticizing effects

Proportions: 70–97% by weight, based on weight of finished polymer

Kinds:
  (A) Vinyl esters having a $CH_2\!\!=\!\!C$ group, e.g.
    vinyl butyrate;
    vinyl decylate;
    vinyl oleate;
    vinyl linoleate;
    vinyl stearate;
    vinyl linolenate;
    vinyl laurate;
    vinyl 2-ethyl hexanoate;
    mixtures of the foregoing in any desired ratios.
  (B) Alkyl acrylates having 1–12 carbons in the alkyl groups, e.g.
    methyl acrylate or crotonate;
    ethyl acrylate or crotonate;
    butyl acrylate or crotonate;
    2-ethyl hexyl acrylate or crotonate;
    2-ethyl hexyl methacrylate or crotonate;
    methyl methacrylate or crotonate;
    butyl methacrylate or crotonate;
    hexyl methacrylate or crotonate;
    decyl acrylate or crotonate;
    mixtures of the foregoing in any desired ratios.
  (C) Alkyl diesters of $\Delta^{2,3}$-enedioyl acids having 1–12 carbons in the alkyl groups thereof, e.g.
    dibutyl maleate;
    diallyl maleate;
    dihexyl maleate;
    di (2-ethylhexyl) maleate;
    dibutyl itaconate;
    dibutyl fumarate;
    mixtures of the foregoing in any desired ratios.
  (D) Hydrocarbon and other monomers having a $CH_2\!\!=\!\!C<$ group, e.g.
    styrene;
    vinyl toluene;
    divinyl benzene;
    acrylonitrile;
    acrylamide;
    mixtures of the foregoing in any desired ratios.

It will be understood that the acidic polymer can be formulated from the above materials to possess any desired $T_1$ value between about 5° C. and 100° C., and preferably between about 15° C. and 60° C., so as to provide a film-forming material which in our emulsions can function as the main film-former at the time of or shortly after application of our emulsion coating to a substrate. It will also be recognized, especially as to our coatings which contain only the binary combination of acidic polymer and monomeric diepoxide, that the acidic polymer establishes on the substrate the film which is later to be cross-linked by a heat treatment. Hence the acidic polymer should be designed through formulation to lay down an applied film which is preferably continuous and pore-free at the time it is laid down. By formulating the acidic polymer to possess a $T_i$ value within the above range and by applying the known art of handling such film-formers, one skilled in the art can readily achieve the desired initially-continuous emulsion-applied film.

The $T_i$ value represents the temperature below which the polymer exhibits rigidity and above which the polymer exhibits flexibility and elastomeric qualities. It is specifically the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$. For certain purposes, copolymers having a $T_i$ value of at least 35° C. are preferred. Thus, where the coating operation is of such a character that a large proportion of the coating may reach surfaces of the equipment or any other articles in the vicinity of the coating operation, as in cases where the coating is sprayed onto small items carried on a conveyor, the use of polymers having a $T_i$ value of 35°–45° C. or higher prevents the coalescence or fusion of the sprayed copolymer particles on the equipment. Instead, the drying at ordinary temperatures causes the deposits to dry out to discrete particles of the copolymer which can be readily brushed or wiped from the surface of the equipment, thereby providing ease of cleaning. On the other hand, there are times when copolymers having $T_i$ values above 60° C. would be unsuitable, particularly when extremely flexible parts are coated and it is desired to provide coatings thereon of adequate flexibility to assure that they do not interfere with the flexing of the parts after priming.

Suitable monomers, which can be copolymerized alone with the acid monomer to provide copolymers having $T_i$ values of at least 5° C., include the alkyl methacrylates having alkyl groups of not over four carbon atoms, tert-amyl methacrylate, tert-butyl acrylate, tert-amyl acrylate, cyclohexyl or benzyl acrylate or methacrylate.

On the other hand, there are many acrylic ester(s)/acid(s) combinations which, when polymerized, produce polymers having $T_i$ values less than 5° C. These monomers include primary and secondary alkyl acrylates whose alkyl groups have from 2 to 18 or more carbon atoms, and the primary and secondary alkyl methacrylates whose alkyl substituents have 6 to 18 or more carbon atoms. Typical compounds coming within the above definition are ethyl acrylate, propyl acrylate, isoproyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, octadecenyl acrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, butoxyethyl acrylate or methacrylate or other alkoxyethyl acrylate or methacrylate, etc.

These monomers which would normally produce polymers having $T_i$ values below 5° C. when homopolymerized may be copolymerized with a suitable proportion of one or more of the first-mentioned monomers and/or acids which on polymerization produce polymers having $T_i$ values above 5° C. The monomers whose homopolymers have low $T_i$ values may instead be copolymerized with acrylonitrile, methacrylonitrile, acrylamide or methacrylamide to produce copolymers having adequately high $T_i$ values in the range of 5° C. to 15° C.

Examples of combinations which can be employed to produce copolymers from 3–30% of acrylic acid, methacrylic acid, itaconic acid, etc., and have $T_i$ values well within the range of 5° to 125° C. include the following. ethyl acrylate-methyl methacrylate, up to about 7:3; ethyl acrylate-acrylonitrile, 4:1 to 1:2; propyl acrylate-acrylonitrile, 7:3 to 1:2; isopropyl acrylate-acrylonitrile, 9:1 to 1:3; isopropyl acrylate-methyl methacrylate, up to about 6:1; propyl acrylate-methyl methacrylate, up to about 1:1; butyl acrylate-acrylonitrile, 7:3 to 1:4; butyl acrylate-methyl methacrylate, up to about 1:1; isobutyl acrylate-acrylonitrile, 4:1 to 2:7; isobutyl acrylate-methyl methacrylate, up to about 3:2; sec-butyl acrylate-acrylonitrile, 5:1 to 1:3 sec-butyl acrylate-methyl methacrylate, up to about 7:3; 2-ethylhexyl acrylate-acrylonitrile, 2:1 to 1:5; 2-ethylhexyl acrylate-methyl methacrylate, up to about 1:1; 2-ethylhexyl acrylate-butyl methacrylate, up to about 1:9; 2-ethylhexyl acrylate-isobutyl methacrylate, up to about 3:7; ethyl acrylate-tert-butyl methacrylate, up to about 9:1; dodecyl acrylate-methyl methacrylate, up to about 2:3; hexyl methacrylate-butyl methacrylate, up to about 1:1. In every case the ultimate copolymer also contains from 3% to about 30% of carboxylic units. Among these and many other acidic polymers, wide variations will be found in the compatibility with the epoxy material(s) in the reacted films. Good compatibility is desired where high gloss is sought, but the invention contemplates the use of reacted acidic resin/epoxy component products where incompatibility or partial incompatibility is sought as a way ot control sheen, flatness or other film properties.

In addition to having $T_i$ values as set forth above, the copolymer products of the invention can have a fairly broad range of reduced viscosity, e.g. from about 0.10 to about 1.50. For average coating purposes a range between about 0.20 and 0.80 is preferred. For selected purposes, other ranges of reduced viscosity can be used to advantage. By "reduced viscosity" is meant the expression $$Ir = \frac{T - T_0}{(T_0)(C)}$$

wherein T is the time required for a low concentrate polymer solution to pass through a standardized Ubbelohde viscometer; wherein $T_0$ is the time for the pure solvent to pass through said viscometer; and wherein C is the concentration of the solution. The concentration of the solution is 0.2 gram in 100 milliliters of cyclohexanone, and the measurement is conducted at 25° C., unless otherwise specified.

Thus, it will be recognized that in accordance with the principles of this invention one seeking to practice those principles has much leeway in choosing the formulation of the acidic polymer which best suits the qualities desired in the finished cross-linked film. These qualities obviously vary with the kinds of monomers and proportions thereof selected for preparing the emulsion-polymerized acidic polymer, with the completeness of copolymerization of the selected starting monomers, with the amount and kind of epoxy component combined with the polymer latex to eventually cross-link the polymer of the latex, with the extent of cross-linking secured between the polymer and the epoxy component, with the compatibility or lack of compatibility of the reacted polymers, and with the amount(s) and kind(s) of water-soluble film-formers, if any, employed in preparing our modified binary combinations.

The modified binary combination

As noted above, the binary combination of acidic polymer and epoxy component in emulsion form sometimes possesses poor spraying qualities in that the spray-applied films, when cured, are not continuous and are perforated with a multitude of fine pores or pin-holes. We have discovered that such pin-holing can be effectively overcome and other properties of the film can be significantly improved by including up to 40% or more (by weight on the solids of the binary film-forming combination, i.e. epoxy component solids plus acidic polymer solids) of water-soluble, heat-reactive film-forming materials; namely, urea/formaldehyde, melamine/formaldehyde, aminotriazine/formaldehyde, phenol/formaldehyde and/or urea/melamine/formaldehyde water-soluble condensation products and/or aqueous-alkali-soluble, acid-precipitable isolated vegetable and animal proteins. Mixtures of the foregoing can also be used. We presently advance no theory in explanation of the effectiveness of such materials for our present purposes, other than to indicate that we believe they function as humectants and thereby retain water in the spray-applied film for a sufficient period of time to allow the wet film to dry down more slowly and hence achieve continuity. The said materials are, of course, capable of reacting with other components in the system and accordingly can function as cross-linking agents.

In addition to overcoming the pin-holding of sprayed films of the binary combination, the water-soluble modifiers can improve salt-spray resistance of the cured film, can improve its gloss, add to its film-forming solids, and can increase hardness, stiffness and/or strength.

THE EMULSION

The emulion coating is prepared from (a) one or more latexes of the polymer(s), (b) from the selected epoxy component in the form of an emulsion and/or without prior emulsification, (c) from the water-soluble film-forming material(s), when such are used, and (d) added emulsifier, if necessary, the latter being non-cationic in character. In some instances the diepoxide and/or any other suitable polyepoxide forming the epoxy component is emulsified first of all by employing the said non-cationic emulsifier(s) and appropriate amounts of water. Such emulsion can then be mixed with the polymer latex or mixture of polymer latexes. The water-soluble film-forming materials can be added to the polymer latex, to the epoxide emulsion, and/or to the mixture of latex and epoxide emulsion, the place or time of its addition in the process of preparing a finished product being immaterial.

The preparation of the polymer latexes, of the emulsions of epoxy component, and of the finished emulsion coating composition will now be described under their separate headings.

PREPARATION OF THE ACIDIC POLYMER LATEXES

The latexes can be made by dispersing in water the polymerizable carboxylic acid(s) and the copolymerizable esters or monomers or at least a portion of them. The selected materials can be effectively so dispersed at any desired monomer solids content by using surface-active water-soluble non-ionic dispersing agents and mixtures thereof with alkali metal salts of fatty alcohol sulfates in amounts between about .20% and 4.0%, based on the weight of the acidic monomer mixture. However, we prefer sodium lauryl sulfate in amounts between about .30% and 4.0% more preferably between .30% and 1.50% Non-ionic agents which can be used alone or with the sodium lauryl sulfate or other organic sulfate are composed of a hydrophobic (e.g. hydrocarbon) portion and a hydrophilic portion. The latter is a polyoxyethylene chain usually terminated with an ethanolic hydroxyl group. This chain is of sufficient size (e.g. 8 or more ethylene oxide groups) to render the agents water-soluble. For combinations of monomers in which polar groups form a relatively good proportion it is preferred that the non-ionic agents have 3–100 —$C_2H_4O$— groups in the hydrophilic portion. When the combination of polymerizable monomers has a relatively high hydrocarbon content, best results are usually had with non-ionic agents having a relatively small proportion of ether groups. These principles will guide the selection of the most effective emulsifiers for the particular monomers chosen for the preparation of suspensions of resulting interpolymers.

Typical emulsifiers which may be used include alkyl-phenoxypolyethoxyethanols having alkyl groups of about seven to twelve carbon atoms, such as heptylphenoxypolyethoxyethanols, octylphenoxypolyethoxyethanols, methyloctylphenoxypolyoxyethanols, nonylphenoxypolyethoxyethanols, dodecyclphenoxypolyethoxyethanols, and the like; polyethoxyethanol derivatives of methylene linked alkyl phenols; sulfur-containing agents such as those made by condensing the required proportion of ethylene oxide with nonyl, dodecyl, tetradecyl, and the like mercaptans or with alkylthiophenols having alkyl groups of six to fifteen carbon atoms; ethylene oxide derivatives of long-chain carboxylic acids, such as lauric, myristic, palmitic, oleic, and the like or mixtures of acids such as found in tall oil; ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, etc.

The amounts of emulsifier or emulsifiers required vary primarily with the concentration of monomers to be handled and to a minor extent with choice of emulsifier, monomers, and proportions of monomer. Generally, the amount of emulsifying agent is between 2% and 12% of the weight of the mixture of monomers and is preferably 4% to 7% of this weight. If the dispersion is to contain a relatively low concentration of interpolymer somewhat less than minimum emulsifying agent indicated by the above rule may prove desirable. In such case the concentration of emulsifying agent in the aqueous solution may desirably be at least 1% of this solution and may be as much as about 7% of the weight of the aqueous solution thereof.

To the dispersion preferably containing only a small part of the monomer mixture, is added a free radical polymerizing catalyst or initiator which can, if desired, be of the redox type. The catalyst alone can be of the peroxide type, and if redox conditions are desired, then reducing actuators or agent and/or metal promoters can be included. The polymerization is then effected, preferably by gradually adding the residue of the monomer mixture at a rate which enables the operator to control and keep the temperature of the mass within his selected operating range.

As the polymerization catalyst there may be used one or more peroxides which are known to act as free radical catalysts and which have solubility on aqueous solutions of the emulsifier. Highly convenient are the persulfates, including ammonium, sodium and potassium persulfates or hydrogen peroxide or the perborates or percarbonates. But there may also be used organic peroxides, either alone or in addition to an inorganic peroxidic compound. Typical organic peroxides include benzoyl peroxide, tert-butyl hydroperoxide, cumene peroxide, tetralin peroxide, acetyl peroxide, caproyl peroxide, tert-butyl perbenzonate, tert-butyl diperphthalate, methyl ethyl ketone peroxide, etc. The preferred organic peroxides have at least partial solubility in the aqueous medium containing the emulsifying agent. Choice of inorganic or organic peroxidic catalyst depends in part upon the particular combination of monomers to be interpolymerized, some of these responding better to one type than the other.

The amount of peroxidic catalyst required is roughly proportional to the concentration of the mixture of monomers. The usual range is 0.01% to 3% of catalyst with reference to the weight of the monomer mixture. The preferred range is from 0.05% to 0.5% while the range of 0.1% to 0.25% is usually best. The optimum amount of catalyst is determined in large part by the nature of the particular monomers selected, including impurities which accompanying particular monomers.

In order to effect interpolymerization at a temperature below that at which coagulation might occur, it is sometimes desirable to activate the catalyst. This may best be accomplished by using a so-called redox system in which a reducing agent is present in addition to the peroxidic catalyst. A redox system can be used advantageously to secure improved physical and/or chemical characteristics in the resulting polymer, to secure higher molecular weight, to promote interpolymerization and to reduce coagulum which sometimes is produced when using nonionic or our other surfactants at high temperature. Many examples of such systems are known. Agents such as hydrazine or a soluble sulfite, including hydrosulfites, sulfoaxalates, thiosulfates, sulfites, and bisulfites can be used. Examples of these are sodium hydrosulfite, sodium metabisulfite, potassium sulfite, zinc formaldehyde-sulfoxalate, and calcium bisulfite. Redox systems may be activated by the presence of a small amount of polyvalent metal ions. Ferrous ions are commonly and effectively thus used (e.g. ferrous sulfate), a few parts per million being sufficient. The peroxidic catalyst can also be activated by the presence of a tertiary amine which is soluble in the reaction medium, such as dimethylethanolamine or triethanolamine.

The amounts of reducing agent or amine required vary somewhat with the choices of peroxide initiator, reducing activator or agents, and metal promoter, if used, also with the choice of emulsifying agent, and with the particular monomers involved. Yet within the limits of about .05% to 3% with reference to the weight of the mixture of monomers will be found the amount of reducing agent for practically any system. The preferred amounts of sulfite agent or equivalent reducing agent fall in the range of 0.1% to 1%.

Copolymerization is best effected below about 80° C. A preferred range is 15° to 70° C., although slightly lower and somewhat higher temperatures are permissible. After most of the monomers have been converted to interpolymer, temperatures even higher than 80° C. can then be applied. In fact after most of the monomers have interpolymerized, the resulting suspension can be heated to boiling without breaking the suspension. During interpolymerization the temperature can be controlled in part through the rate at which monomers are supplied and interpolymerized and/or through applied cooling.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomer or monomers as polymerization proceeds. An advantage of gradual addition of monomers lies in reaching a high solids content with optimum control and with maximum uniformity of product. Additional catalysts or additionaly components of the redox system may also be added as polymerization proceeds.

With the attaintment of desired interpolymer content in good yield, with or without removal of residual monomers, the suspension is cooled, cooling to a range of 35° to 20° C. being generally satisfactory. The suspension is then preferably rendered mildly alkaline by adding ammonia or a water-soluble amine, or a mixture thereof. As organic amine bases there may be used morpholine, n-methyl morpholine, diethylamine, triethylamine, piperidine, pyrrolidine, triethanolamine, dimethylethanolamine, ethanolamine, isopropanolamine, di-isopropanol amine, tri-isopropanalamine, diethanolamine, or the like, particularly amines of molecular weights not over 150. A combination of an organic base and ammonia is often particularly useful.

In some instances it may be desired at this point to make an adjustment of the viscosity of the alkaline suspension as by adding a small amount (e.g. 0.1–5%) of a thickening agent, such as sodium alginate, sodium or ammonium polyacrylate, methylcellulose, hydroxyetheyl cellulose, or the like. In this way compensation can be made for possible minor variations in viscosity or emulsion stability from batch to batch of suspensions. The choice of thickening agent can also influence adversely the resistance qualtities of the cured and cross-linked film. We have found methylcellulose and hydroxyethyl cellulose to be least harmful to compatibility of the reacted polymers and least harmful to salt spray resistance, and particularly prefer hydroxyethyl cellulose.

The emulsion of the epoxy component

As noted above, the epoxy component can in many instances be added directly to the neutralized polymer latex, but when its direct addition tends to render that latex (or a mixture of latexes) somewhat unstable, then we prefer to pre-emulsify the epoxy component. For such pre-emulsification we can use any suitable anionic or non-ionic surfactants or mixtures thereof. The non-ionic agents identified above are suitable but they can be supplanted with any of the other known non-ionics. Likewise the choice of anionics when used alone or in admixture with non-ionics is immaterial as long as the selected surfactants yield an emulsion of the epoxy component which is itself stable and which can be added to the latex or mixture of latexes without causing the finished mixture to be unstable. It will be understood, of course, that the surfactants are preferably chosen on the basis of their ability to yield stable pre-emulsions and finished mixtures at relatively low total surfactant content. This is because surfactants remain in the cured film and hence tend to render it water-sensitive. By choosing surfactants which function effectively at low levels, then the finished, cured film will exhibit minimum water-sensitivity consistent with the desired protective and durability qualities. In other words, surfactants in an emulsion coating composition are undesired but nevertheless necessary ingredients, and hence should be selected so as to accomplish their needed functions at the lowest overall level which is possible. In this respect it is desirable to eliminate the pre-emulsification of the epoxy component and to use such expedient only when the epoxy component and polymer latex(es) cannot otherwise be stably mixed together.

The preparation of the pre-emulsion of the epoxy component presents no problems. The emulsifier component is dissolved in whatever amount of water may be needed to provide the desired total content of water in the finished mixture of latex(es) and pre-emulsion. The epoxy component is then added to the solution and stirred in by means of a high speed mixer. The emulsifier solution can be heated before adding the epoxy component, and/or the latter can be heated sufficiently to be fluid when added to the emulsifier solution.

The finished emulsion

The finished emulsion is a mixture of the following components:

(A) One or more acidic (i.e. unneutralized) or neutralized-and-stably-alkaline latexes containing the acidic polymer, with or without hydroxyethyl cellulose and/or like additives described above;

(B) The epoxy component, unemulsified or pre-emulsified, in an amount such that the epoxy component solids constitute 1–20% by weight, based on the total weight of latex solids plus epoxy component solids;

(C) As an optional component, up to 40% by weight, based on the combined weight of latex solids plus epoxy component solids, of one or more of the water-soluble film-formers identified earlier above.

This mixture of components should, of course, be a stable and preferably alkaline emulsion having any desired solids content but preferably having a solids content between about 30% and 65%, by weight. Such a mixture can be applied by any of the usual application methods to a desired substrate to yield unpigmented films which will be cross-linked and thermoset when the substrate and applied film are baked. The above mixture of components can be pigmented to give desired sheen, gloss, color and/or hiding, and/or can be modified in its rheological characteristics for flow, leveling, etc., by including fillers and/or extenders, finely divided water-swellable hydrous silicates (e.g. bentonite and montmorillonite clays) finely-divided silica gel fillers, asbestos, talc, etc. Dyes can also be included for desired color effects.

It should be recognized that in the mixture of components which constitutes the finished emulsion the epoxy groups provided by the epoxy component need not be carefully balanced against the unneutralized or the neutralized carboxyl groups; the latter are restored to active carboxyl groups when the finished emulsion film is baked for curing. A stoichiometric balance would require two carboxyl groups per epoxy group. We have found, however, that highly useful protective films can be prepared when: (a) the epoxy groups and carboxyl groups are in stoichiometric balance, (b) the stoichiometric requirements of the epoxy groups exceed the carboxyl groups by as much as 50%, or (c) the carboxyl groups exceed the stoichiometric requirements of the epoxy groups by as much as 50%. In case (a) the cured film is as fully ester-cross-linked as the carboxyl and epoxy groups can make it. In case (b) less ester-type cross-linking occurs but cross-linking of ether and/or other types can occur due to the excess of epoxy groups. In case (c) ester-type cross-linking consumes the epoxy groups and leaves residual carboxyl groups which are useful for improving adhesion to substrates, for promoting curing of acid-promoted modifiers, such as the amine/aldehyde and phenol/aldehyde mono- to poly-methylol condensation products, and/or for insolubilizing part or all of the isolated protein modifiers. One practicing the invention can thus tailor the formulation to suit his selected materials and his desired qualities in the cured film. The 50% departure above and below stoichiometric equivalency is a preferred maximum amount, but under some conditions greater departures up to 70% can be found useful without unduly sacrificing thermosetting qualities in the film resulting from ester-type cross-linking.

It will be appreciated that the finished emulsion can contain small amounts (e.g. up to about 15% or slightly more) of organic solvents, the latter usually representing solvents added to the acidic polymer during or after emulsion-polymerization or added to the polymeric latex or polymer/epoxy emulsion to adjust (a) emulsion-polymerization conditions (b) compatibility attributes in the mixture of latex(es) and epoxy component and/or (c) rheological qualities, drying rates in an applied film of the finished emulsion, and/or film continuity in the latter. Solvents so used should of course be readily volatile during the baking treatment and hence should be selected as to boiling range and chemical inertness as to not introduce difficulty in freeing the cured film from such solvents. Hydrocarbon solvents are generally preferred although stable (non-reactive) ester, ketone, ether, ether-ester, nitro-aliphatics and other types can also be used.

The finished emulsion is acidic, as noted, but will ordinarily be made alkaline by the preferred neutralization and alkalization of the acidic polymer latex. However, the pH so established in the finished emulsion can be further raised by addition of alkaline materials preferably amines, to secure a pH best suited to the application method used in applying a film of the finished emulsion to a substrate. We have found that a pH between about 7.5 and 10.5 is generally useful in securing good emulsion stability. The pH has been found to be particularly helpful in promoting intercompatibility of the latex(es) and the epoxy component and hence to be a practical way of adjusting a finished emulsion so as to lay down a film which will cure to a high gloss. It will be understood that when packaged finished emulsions are to be stored for some time before use, the pigments, fillers, rheology-control agents, etc. should be selected so as to induce no significant shift in the pH of the emulsion to packaged. Likewise, the container should be of a material which is resistant to the alkalinity of the finished emulsion. In some instances, it may be convenient to package the emulsion at a lower alkaline pH than is best suited for laying down the desired film, or can even be left acidic, in which cases the emulsion can be adjusted in pH by the consumer just before use, as by adding alkaline agents specified in the instructions accompanying the package.

In like manner, a packaged emulsion can be thinned with water just prior to use where it is convenient to package the emulsion at higher solids contents than are best suited to a customer's particular use or method of application. At the time of application, the solids content of the finished emulsion can range widely, from about 30% to 65% by weight.

The curing treatment

As noted above, an applied film of the finished emulsion is ultimately cured by a baking treatment carried out at temperatures generally between about 200° F. and 400° F. for time periods of from about 2 minutes to 60 minutes, longer time periods applying to the lower temperatures. The applied films can be dried (i.e. the water driven off) in the early baking stages, or they can be pre-dried at room temperature or at moderately elevated temperatures before being placed in the baking open. Such pre-drying is ordinarily preferred.

It will be understood that during the baking operation, the volatile alkaline agents used to neutralize the carboxyl groups of the acidic polymer are driven off, thereby restoring the active carboxyl groups. The latter then react with the epoxy groups of the epoxy component to cause ester-type cross-linking. As noted above, other types of cross-linking reactions can also occur at this stage or subsequently during the baking treatment, all with the net result that the originally thermoplastic acidic polymer is converted more or less into a thermoset cross-linked film exhibiting greater insolubility in solvents and greater resistance to softening under heat. As will be understood, the secured degree of insolubility and infusibility depends on the completeness of the cross-linking reactions as well as on the amount of cross-linking provided by the proportions of carboxyl groups to epoxy groups in the formulation.

The following examples illustrate the principles of the invention and include the best modes presently known to us for practicing those principles. In these examples, except where otherwise noted, the latex of acidic polymer is prepared as follows:

(1) The polymerizations were carried out in a Morton polymerization flask of 2 liter capacity fitted with a stirrer, a condenser and a dropping funnel.

(2) The source of polymerization heat was a warm bath.

(3) To the flask was added (a) the specified emulsifier, (b) demineralized (deionized) water, (c) the specified polymerization catalyst and (d) 10% weight percent of the specified mixture of monomers.

(4) The so-charged flask was immersed in the water bath and heated therein to 70° C., a slight exotherm being then noted.

(5) The remaining mixture of monomers was added at a uniform rate over a 2-hour period, the temperature being maintained between 67–75° C. with the aim being to maintain it between 70–72° C.

(6) After all of the mixed monomers had been added the temperature was maintained for 1–2 hours, thereby reducing the residual monomer content to less than 1% by weight.

In other tests, not here included in detail, we found that equivalent results can be secured (a) by carrying out the polymerization as described above except that room temperature and redox conditions are used, sodium bisulfite being added as the reducing catalyst promoter, or (b) using a temperature of 80–90° C. instead of 67–75° C.

EXAMPLE 1

Latex prepared at 70–72° C. and held 1.5 hours. The charge and monomer formulation were as follows:

| | G. |
|---|---|
| Deionized water | 600.0 |
| Sodium lauryl sulfate | 33.5 |
| Potassium persulfate | 1.5 |

Monomer mixture:
| | |
|---|---|
| Styrene | 245 |
| Decyl acrylate | 205 |
| Methacrylic acid | 50 |
| Total | 500 |

The finished latex of acidic terpolymer was neutralized with 10% aqueous ammonium hydroxide to pH of 8.0.

Finished emulsions were prepared by adding directly (without pre-emulsification) 5 parts and 10 parts of commercial carboxylate diepoxide (EP–201) per 100 parts by weight of the neutralized latex. Both proportions of diepoxide yielded clear, glossy films when draw-down films of the finished emulsion on glass were air-dried and then baked at 300° F. for 15 minutes. Glass was used (rather than the usual metal) to permit easy detection of haziness (incompatibility). The clarity of the films evidenced full compatibility.

EXAMPLE 2

A latex was prepared in the manner described above at 67–75° F. from:

| | G. |
|---|---|
| Deionized water | 600.0 |
| Sodium lauryl sulfate | 33.5 |
| Potassium persulfate | 1.5 |

Monomer mixture:
| | |
|---|---|
| Styrene | 245 |
| Vinyl 2-ethylhexoate | 205 |
| Methacrylic acid | 50 |
| Total | 500 |

The resulting latex was neutralized with 10% aqueous ammonium hydroxide to pH 8.0. Into portions of the neutralized latex were stirred 5–20% of EP–201, after which the various finished emulsions so secured were coated onto glass and baked 15 minutes at 300° F. All of the resulting films were clear and glossy showing complete compatibility.

EXAMPLE 3

A latex was prepared as described above at 67–75° F. from:

| | G. |
|---|---|
| Deionized water | 600.0 |
| Sodium lauryl sulfate | 33.5 |
| Potassium persulfate | 1.5 |

Mixed monomers:
| | |
|---|---|
| Styrene | 150 |
| Hexyl methacrylate | 300 |
| Methacrylic acid | 50 |
| Total | 500 |

The latex was neutralized with 10% aqueous ammonium hydroxide to pH of 8. To the neutralized latex was added 5–10% of EP–201 by stirring it in. Baked films of the resulting finished emulsions were clear and glossy.

EXAMPLE 4

A latex was prepared at 67–75° F. from:

| | G. |
|---|---|
| Deionized water | 600.0 |
| Sodium lauryl sulfate | 33.5 |
| Potassium persulfate | 1.5 |

Mixed monomers:
| | |
|---|---|
| Hexyl methacrylate | 300 |
| Methyl methacrylate | 150 |
| Methacrylic acid | 50 |
| Total | 500 |

The latex was neutralized as in Example 3 to pH 8 and then was mixed with 5–10% of EP–201 by stirring the latter into the former. Baked draw-down films of the resulting finished emulsion were clear and glossy.

EXAMPLE 5

A latex was prepared at 67–75° F. from:

| | G. |
|---|---|
| Deionized water | 600.0 |
| Sodium lauryl sulfate | 33.5 |
| Dodecyl mercaptan | 10.0 |
| Potassium persulfate | 1.5 |

Mixed monomers:
| | |
|---|---|
| Butyl acrylate | 225 |
| Methyl methacrylate | 125 |
| Methacrylic acid | 150 |
| Total | 500 |

When the latex was neutralized with 10% aqueous ammonium hydroxide, a solution of the polymer resulted. EP–201 at amounts between 5–20% were stirred into the solution to yield finished emulsions. Baked draw-down films secured from the various finished emulsions were clear and glossy.

EXAMPLE 6

A latex was prepared at 67–75° F. from:

| | G. |
|---|---|
| Deionized water | 700.0 |
| Dihexyl sodium sulfosuccinate (Aerosol MA, 80% solids) | 10.0 |
| Potassium persulfate | 1.5 |

Mixed monomers:
| | |
|---|---|
| Styrene | 295 |
| 2-ethylhexyl acrylate | 150 |
| Glacial acrylic acid | 50 |
| Acrylamide | 5 |
| Total | 500 |

The latex was neutralized to pH 8.0 with a 25% solution of 2 amino 2 methyl 1 propanol. EP–201 was stirred into various portions of the neutralized latex to provide 5–20% thereof by weight. Baked draw-down films of the resulting finished emulsions were clear and glossy.

EXAMPLE 7

A latex was prepared at 67°–75° F. from:

| | G. |
|---|---|
| Deionized water | 600.0 |
| Sodium lauryl sulfate | 33.5 |
| Potassium persulfate | 1.5 |

Mixed monomers:
| | |
|---|---|
| Methyl methacrylate | 245 |
| 2-ethylhexyl acrylate | 205 |
| Glacial methacrylic acid | 50 |
| Total | 500 |

The latex was neutralized with 10% aqueous ammonia to pH 8.

A pre-emulsion of EP–201 was prepared from:

|  | G. |
|---|---|
| EP–201 | 50 |
| Tergitol XD [1] | 3 |
| Water | 47 |

[1] Tergitol XD is a semi-solid nonionic polyalkylene glycol ether of 100% solids content, functioning as emulsifier, specifically butoxy polypropylene glycol ethylene oxide.

The solution of emulsifier was prepared by dissolving the Tergitol XD in the water. Then the EP–201 was stirred in.

A finished emulsion coating composition was prepared from:

|  | G. |
|---|---|
| Neutralized latex solids | 82.3 |
| EP–201 emulsion solids | 9.5 |
| Water-soluble phenol/formaldehyde condensation product (Bakelite BRL–1100), solids | 7.2 |
| Triton X–100 [1] emulsifier | 1.0 |
| Total solids | 100.0 |

[1] Triton X–100 is polyoxyethanol ether of octyl phenol, having 8–9 oxyethylene groups; 100% solids.

The said coating composition was sprayed on glass plates and then baked for 20 minutes at 325° F. or for 10 minutes at 400° F. The baked panels carried adherent, clear, hard glossy coatings which were continuous and free of pinholes. The emulsions were also brushed, dipped and roll-coated on glass and steel panels and baked at the above schedules. The resulting coatings were equally glossy and free of defects. Equivalent results are secured when the phenol/formaldehyde condensation product is replaced (on an equal solids weight basis) with water-soluble urea/formaldehyde, urea/melamine/formaldehyde, melamine/formaldehyde, or benzoguanamine/formaldehyde resin. Likewise, equivalent results are secured when the phenol/formaldehyde product is replaced (on an equal solids weight basis) with an aqueous sodium carbonate (or other alkaline "cutting" agent) solution of isolated soya protein, casein, or isolated peanut protein. A pH of about 8 is preferable in such aqueous solutions of isolated protein.

EXAMPLE 8

(A redox polymerization)

| Materials: | Parts by weight |
|---|---|
| Deionized water | 120.00 |
| Nonionic surfactant— |  |
| Igepal CO–970 [1] | 5.00 |
| Monomers— |  |
| Ethyl acrylate [2] | 85.00 |
| Glacial methacrylic acid [3] | 15.00 |
| Ammonium persulfate | 0.25 |
| Sodium metabisulfite | 0.25 |

[1] This is a polyoxyethylene glycol ether of nonylphenol; 97% ethylene oxide; 100% concentration.
[2] Stabilized with .02% methylethylhydroquinone.
[3] Stabilized with 60 p.p.m. hydroquinone.

Procedure (1) Charge water and Igepal CO–970 to flask.

(2) Mix the monomers and charge 35% of the monomers to the flask.

(3) Sparge the charge with nitrogen for 30 minutes.

(4) Dissolve the persulfate and bisulfite in water to prepare a 5% solution; add the solution to the flask.

(5) Heat of reaction will raise temperature of charge in about 5 minutes; then begin controlled gradual addition of monomers.

(6) Add the monomer mixture at a uniform rate to maintain a reaction temperature of 50–55° C.; cooling water may be needed to control temperature. Temperature of charged mass not allowed to go over 65° C.

(7) After all the monomer mixture has been added, allow temperature to rise to 65° C. but no higher; maintain this temperature for 60 minutes.

(8) To remove residual monomer, sparge charged mass with nitrogen and pass effluent to an open scrubber.

(9) Cool to room temperature.

(10) Neutralize to pH 7 with ammonium hydroxide.

Preparation of emulsion coatings

To the neutralized latex prepared above, a molar equivalent of EP–201 was added, with constant agitation, in the form of a 50% emulsion corresponding to the pre-emulsion of Example 7. The resulting mixed emulsion was applied to metal panels and baked 15 minutes at 300° F. The baked films were clear and glossy and showed marked improvement in water resistance in comparison with baked films otherwise similar except for omission of the EP–201.

EXAMPLE 9

| Materials: | Parts by weight |
|---|---|
| Deionized water | 120.0 |
| Aerosol MA | 1.8 |
| Monomers— |  |
| Styrene | 43.0 |
| 2-ethyl hexyl acrylate | 40.0 |
| Methacrylic acid | 10.0 |
| Acrylonitrile | 6.0 |
| Acrylamide | 1.0 |
| Potassium persulfate | 0.3 |

The foregoing monomers were emulsion polymerized through the presence of other materials, all in the manner of Example 1 except that some of the finished latex was not neutralized while the remainder was neutralized, some with ammonium hydroxide and balance with triethanol amine.

Pre-emulsion of EP–201 and Epon 828 were prepared at 50% solids content by using:

|  | Parts | Parts |
|---|---|---|
| Water | 95.0 | 95.0 |
| Tergitol XD | 2.5 | 2.5 |
| Triton X–200 [1] | 2.5 | 2.5 |
| EP–201 | 100.0 |  |
| Epon 828 [2] |  | 100.0 |

[1] Sodium salt of octylphenol ethylene oxide sulfonate containing about 5 mols ethylene oxide.
[2] A liquid epichlorhydrin/bisphenol epoxy-hydroxy-ether condensation product having an epoxy equivalent weight of 100 grams.

The epoxy pre-emulsions were separately added to the ammonia-neutralized, the triethanol amine-neutralized and the unneutralized (acidic) latexes to provide six different compositions in which the epoxy groups and carboxyl groups were substantially in stoichiometric proportions. The resulting mixed emulsions were applied to glass panels and baked 20 minutes at 300° F. Observation of the baked films revealed that all were clear and glossy, and hence had achieved full compatibility of the resinous materials.

It will be appreciated that the foregoing were laboratory tests in which shelf-life was not a factor. For best shelf life the EP–201 should be added only to the neutralized latexes. Conversely the Epon 828 is best added to the unneutralized latexes because the bisphenol/epichlorhydrin resins are effectively catalyzed for curing with nitrogen bases whereas they react slowly, if at all, at room temperature with carboxyl groups.

EXAMPLE 10

(Example of maleic ester monomer)

The polymerization procedure set forth hereinabove just ahead of Example 1 was here used except that the 90% residue of monomers was added in step 5 in 1.5 hours instead of 2 hours.

| Materials: | Parts by weight |
|---|---|
| Deionized water | 120.0 |
| Aerosol MA-80 [1] | 2.0 |
| Monomers— | |
| Styrene | 48.0 |
| Dibutyl maleate | 41.0 |
| Glacial methacrylic acid | 10.0 |
| Acrylamide | 1.0 |
| Potassium persulfate | 0.3 |

[1] This is an 80% solids solution of dihexyl sodium sulfosuccinate.

Three parts of Triton X-100 nonionic surfactant were added as post-stabilizing agent. A molar equivalent of EP-201 was added with stirring. The resulting emulsion coating composition was applied to metal panels and then baked for 15 minutes at 300° F. Companion panels prepared from the latex without added EP-201 were similarly prepared and baked. The baked panels were placed in water for an extended period. The films containing the EP-201 did not whiten while the films containing no EP-201 turned white, thereby indicating that the presence of the EP-201 provided cross-linking with development of thermoset resistance qualities.

EXAMPLE 11

(Illustrating compatibility of Epon 828)

Epon 828, supra, and EP-201 were each separately pre-emulsified according to the following formulas:

| | Parts | Parts |
|---|---|---|
| EP-201 | | 100.0 |
| Epon 828 | 100.0 | |
| Tergitol XD, supra | 2.5 | 2.5 |
| Triton X-200 | 5.0 | 5.0 |
| Water | 92.5 | 92.5 |

The resulting emulsions of 50% epoxy resin solids were added to methacrylate latexes analogous to that of Example 4 except for containing 5%, 7%, 10% and 15% of methacrylic acid based on 100 parts of monomers. The epoxy emulsion in every instance was added in amounts yielding 1.1 molar equivalents (based on acid contents of the methacrylate polymers). The resulting mixed emulsions were applied to glass panels and baked for 15 minutes at 300° F. Observation of the baked films revealed that the EP-201 films were fully compatible at all acid levels whereas the Epon 828 films were compatible only at the 5% and 7% acid levels. Slight incompatibility developed at the 10% level, and clearly-evident incompatibility was exhibited at the 15% level. Tests of the baked films for mar resistance and chemical resistance showed that the Epon 828 induced little change in mar resistance at all tested acid levels whereas EP-201 induced improved mar resistance and chemical resistance as the acid level increased.

The eight baked films were rated by three paint chemists without knowing anything about their compositions or histories. An arbitrary scale was used wherein 1=best and 10=poorest. The averaged results are shown in the table:

| Epoxy resin | Mar resistance | Compatibility | Film properties |
|---|---|---|---|
| Epon 828 | 8 | 7.3 | 7.1 |
| EP-201 | 3 | 4.0 | 4.7 |

Examples 6, 9, 10, 20 and 21 illustrate a polymerization technique which we presently prefer; namely, a copolymerization of any of the various monomers described earlier above which is carried out in the presence of about 0.5–2.5% of acrylamide (by weight on the mixed monomers) in combination with about 0.8–3.0% (on same basis) of Aerosol MA-80. We and the inventors presently do not know the true explanation of why the latter two materials cooperate in the way they do to produce improved copolymer latices, but we and the inventors have found through experience that the two materials afford excellent yields of copolymers and produce latices which have excellent emulsion stability. The acrylamide/surfactant combination can be used satisfactorily in place of the non-ionic surfactants described earlier herein, and when such substitution is made all that has been said about the polymerization with the non-ionic surfactants applies fully to the said substituted combination.

The following additional examples illustrate various copolymers of the invention which can be used along with or in place of the copolymers of the preceding examples, with concordant results.

EXAMPLE 12

A copolymer is emulsion-polymerized by using the following materials:

| | G. |
|---|---|
| Distilled water | 430.0 |
| Alipal CO-436 [1] | 10.5 |
| OEP-20 [2] | 17.2 |
| Sodium bicarbonate | 10.0 |
| Vinyl acetate | 20.0 |
| 2-ethylhexyl acrylate | 40.0 |
| Dodecyl mercaptan | 2.0 |
| Potassium persulfate | 1.0 |
| Glacial methacrylic acid | 6.4 |
| Vinyl acetate | 318.0 |
| 2-ethylhexyl acrylate | 46.0 |

[1] Octylphenol polyoxyethylene oxide sulfonate, sodium salt.
[2] Ether of octylphenol and a polyoxy-ethylene glycol of 20 oxyethylene groups.

The polymerization is carried out in the manner described hereinabove except that the addition time is 2.75 hours and the temperature is 70° C. The pH is 4.4.

The resulting emulsion, when applied as a film, lays down a clear dry film having good adhesion and resistance to water-spotting. The reduced viscosity is 0.5.

EXAMPLE 13

A five-gallon batch is prepared by using the following materials:

| | G. |
|---|---|
| Distilled water | 8000.0 |
| Aerosol AY [1] | 34.4 |
| OPE-30 [2] | 296.0 |
| Triton X-100 [3] | 104.0 |
| Daxad [4] | 17.2 |
| Potassium persulfate | 32.0 |
| Dodecyl mercaptan | 32.0 |
| Styrene [5] | 320.0 |
| 2-ethylhexyl acrylate [5] | 320.0 |
| Glacial methacrylic acid [5] | None |
| Styrene [6] | 3536.0 |
| 2-ethylhexyl acrylate [6] | 2496.0 |
| Glacial methacrylic acid [6] | 206.4 |
| Alipal CO-436 [7] | 238.4 |
| Distilled water [7] | 480.0 |

[1] Sodium salt of isopropyl naphthalene sulfonate.
[2] Ether of octylphenol and a polyoxyethylene glycol of 30 oxyethylene groups.
[3] Ether of octylphenol and a polyoxyethylene glycol of 9–10 oxyethylene groups.
[4] Condensed alkyl aryl sulfonic acid, sodium salt.
[5] Added at beginning as a "heel."
[6] Added subsequently during "addition time."
[7] Added as a mixture when the additions of "6" amount to 65% of total.

The addition time is 2 hours and 40 minutes; the temperature is 74–78° C. and the final holding time is 1 hour at 76° C. The batch is finally neutralized with ammonium hydroxide to a pH of 7.7; the non-volatile content is 45.0% representing a 99% conversion. Hexylene glycol is added to the neutralized emulsion in the amount of 4.75% to aid in film formation, the percentage being based on the non-volatile content of the emulsion.

The reduced viscosity of the copolymer, as secured from the unneutralized latex, is 0.80.

EXAMPLE 14

A copolymer in latex form is prepared from the following materials:

| | G. |
|---|---|
| Distilled water | 530.0 |
| Aerosol MA (80%) | 6.7 |
| Acrylamide | 8.6 |
| Sodium bicarbonate | 1.0 |
| Potassium persulfate | 2.0 |
| Dodecyl mercaptan | 2.0 |
| Styrene [1] | 12.0 |
| 2-ethylhexyl acrylate [1] | 13.0 |
| Acrylonitrile [1] | 12.0 |
| Styrene [2] | 160.0 |
| 2-ethylhexyl acrylate [2] | 150.0 |
| Acrylonitrile [2] | 70.0 |
| Glacial methacrylic acid [2] | 12.0 |

[1] Added at beginning as heel.
[2] Added during "addition time."

Addition time is 3 hours; temperature is 75° C. Reduced viscosity of the copolymer secured from the final emulsion is 1.44.

The emulsion lays down a dry film of good quality which can be softened with toluol.

EXAMPLE 15

An emulsion-polymerized copolymer is prepared from the following materials:

| | G. |
|---|---|
| Distilled water | 530.0 |
| Aerosol MA (80%) | 5.4 |
| Acrylamide | 6.45 |
| Daxad | 1.1 |
| Potassium persulfate | 2.0 |
| Dodecyl mercaptan | 2.0 |
| Styrene [1] | 23.0 |
| 2-ethylhexylacrylate [1] | 13.0 |
| Styrene [2] | 230.0 |
| 2-ethylhexyl acrylate [2] | 150.0 |
| Glacial methacrylic acid [2] | 13.0 |

[1] Added at the beginning, as heel.
[2] Added during "addition time."

Addition time is 3.5 hours; temperature is 75° C. Reduced viscosity of the copolymer is 0.715.

The emulsion lays down a film exhibiting poor flow characteristics but which is clear and continuous, and exhibits good adhesion and water resistance. Baked films are of good quality.

When the emulsion is modified by adding EP–201 in an amount of 10% by weight (based on emulsion solids), the modified emulsion exhibits good correaction with the epoxy monomer but the film remains somewhat thermoplastic. The coreaction is best when the emulsion is neutralized to an alkaline pH, e.g. with ammonium hydroxide. Such neutralized emulsion can be used to lay down primer films.

EXAMPLE 16

An emulsion-polymerized copolymer is prepared from the following materials:

| | G. |
|---|---|
| Distilled water | 530.0 |
| Aerosol MA (80%) | 5.4 |
| Acrylamide | 6.45 |
| Daxad | 1.1 |
| Potassium persulfate | 2.0 |
| Dodecyl mercaptan | 2.0 |
| Styrene [1] | 20.0 |
| 2-ethylhexyl acrylate [1] | 17.0 |
| Styrene [2] | 260.0 |
| 2-ethylhexyl acrylate [2] | 120.0 |
| Glacial methacrylic acid | 13.0 |

[1] Added initially, as heel.
[2] Added subsequently, during "addition time."

Addition time is 2.5 hours; temperature is 75° C. Reduced viscosity of finished copolymer is 0.79.

The emulsion lays down a film exhibiting fair flow, but it is non-continuous. Diethyleneglycol monoethyl ether, added as a filming aid, did not bring about continuity.

EXAMPLE 17

An emulsion-polymerized copolymer is prepared from the following materials:

| | G. |
|---|---|
| Distilled water | 530.0 |
| Tergitol No. 4 [1] | 34.4 |
| Potassium persulfate | 2.0 |
| Methyl methacrylate [2] | 20.0 |
| 2-ethylhexyl acrylate [2] | 19.0 |
| Methyl methacrylate [3] | 200.0 |
| 2-ethylhexyl acrylate [3] | 170.0 |
| Glacial methacrylic acid [3] | 21.0 |

[1] Sodium sulfate derivative of 7-ethyl-2-methyl-undecanol.
[2] Added initially, as heel.
[3] Added subsequently, during "addition time."

Addition time is 3 hours; temperature is 75° C. The reduced viscosity of the copolymer secured from the 44.6% non-volatile emulsion is 1.18.

The neutralized emulsion deposits a dry film of good quality which is clear, of good adhesion, of good resistance to water spotting and of good flexibility. The copolymer in the dry film is compatible with up to 15% by weight of added EP–201 monomer, and a neutralized emulsion in which this amount of monomer is incorporated is stable after at least five months of storage at room temperature.

EXAMPLE 18

An emulsion-polymerized copolymer is prepared from the following materials for use in automobile top-coat exposure tests:

| | G. |
|---|---|
| Distilled water | 530.0 |
| Aerosol MA (80%) | 5.38 |
| Acrylamide | 5.4 |
| Daxad | 1.1 |
| Potassium persulfate | 2.0 |
| Dodecyl mercaptan | 2.0 |
| Styrene [1] | 20.0 |
| 2-ethylhexylacrylate [1] | 19.0 |
| Glacial methacrylic acid [1] | 5.0 |
| Styrene [2] | 260.0 |
| 2-ethylhexyl acrylate [2] | 110.0 |
| Glacial methacrylic acid [2] | 15.0 |

[1] Added initially, as heel.
[2] Added subsequently, during "addition time."

Addition time is 2.5 hours; temperature is 75° C. Reduced viscosity of the copolymer secured from the latex is 0.68.

An applied film of the latex is clear when wet but is converted to a loose powder on drying.

When EP–201 monomer is added in an amount of 10%, the modified emulsion remains stable for at least four months.

When the emulsion is modified by adding 10% by weight of water-soluble phenol/formaldehyde polymethylol condensation product plus 10% by weight of ethylene-glycolmonobutyl ether, a film, somewhat on the brittle side, is formed on drying an applied wet film.

EXAMPLE 19

An acidic copolymer latex having a non-volatile content of 44.3% by weight is prepared from the following materials:

| | G. |
|---|---|
| Distilled water | 1590 |
| Tergitol No. 4 (of Ex. 17) | 103 |
| Potassium persulfate | 6 |

|   | G. |
|---|---|
| Methyl methacrylate [1] | 60 |
| 2-ethylhexyl acrylate [1] | 50 |
| Methyl methacrylate [2] | 570 |
| 2-ethylhexyl acrylate [2] | 478 |
| Glacial methacrylic acid [2] | 129 |

[1] Added initially as heel.
[2] Added subsequently during "addition time."

Addition time is 2.5 hours; temperature is 75–78° C. Reduced viscosity of copolymer of the latex is 1.09.

An applied film of the latex dries to a discontinuous film of good quality. Film properties are improved by adding 5–15% of EP–201 monomer, whereby coreaction and cross-linking is secured. Hexylene glycol in amounts of 5–50% added along with the EP–201 leads to continuous films of excellent protective qualities.

EXAMPLE 20

The emulsion polymerization described in Example 9 was repeated except that the Aerosol MA–80 was increased to 2.8% and the acrylamide was reduced to 0.6%. The resulting emulsion was used to replace the corresponding emulsion of Example 9, with equivalent results.

EXAMPLE 21

The emulsion polymerization described in Example 10 was repeated except that the Aerosol MA–80 was reduced to 1.0% and the acrylamide was increased to 2.3%. The resulting emulsion was used to replace the corresponding emulsion of Example 10, with equivalent results.

Having described our invention what we claim is:

1. A thermosetting emulsion coating composition of the oil-in-water type the resinous film-forming portion of which is composed essentially of (A) acidic, emulsion-polymerized, latex-borne copolymer of unsaturated mixed monomers selected from the group consisting of $\alpha,\beta$ unsaturated carboxylic acids in amounts between about 3% and 30% by weight based on the total weight of monomeric material, balance 1–12 carbon alkly esters of $\alpha,\beta$ unsaturated monocarboxylic acids, 1–12 carbon alkyl diesters of $\alpha,\beta$ unsaturated $\alpha,\beta$ dicarboxylic acids, vinyl esters of hydrocarbyl monocarboxylic acids, vinyl mononuclear aromatic hydrocarbons, acrylonitrile and acrylamide, said copolymer having a $T_1$ value between about 5° and 100° C. and having been emulsion-polymerized at temperatures between about 67° and 90° C. and in the presence of peroxidic free-radical catalyst from an aqueous dispersion of its monomers in a continuous aqueous phase containing non-cationic surfactant consisting essentially of about 0.8–3.0% of the sodium salt of dihexyl sulfosuccinate in combination with about 0.5–2.5% of acrylamide; said percentages being by weight based on the mixed monomers, and (B) an epoxy component, amounting to 1–20% by weight based on the combined weight of acidic copolymer plus epoxy component solids, consisting of monomeric diepoxides of cycloaliphatic esters conforming to the formula

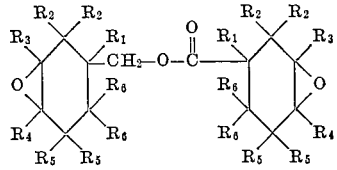

wherein $R_1$ through $R_6$ represent like and unlike members selected from the group consisting of hydrogen and lower alkyl radicals, said epoxy component, via the selected amount and kind thereof, and said acidic latex together providing epoxy groups and carboxyl groups in a molar ratio between about .5 and 1.5.

2. An emulsion coating composition as claimed in claim 1 wherein said acidic copolymer has been neutralized with at least one nitrogen base selected from the group consisting of ammonia and water-soluble organic amines, wherein said emulsion has an alkaline pH.

3. An emulsion coating composition as claimed in claim 2 wherein the monomeric diepoxides of cycloaliphatic esters are added to said emulsion-polymerized latex-borne copolymer in the form of a stable, prepared emulsion composed essentially of said diepoxides, water, and a small emulsifying amount of non-cationic surfactant.

4. A coating composition as claimed in claim 2 to which has been added a small amount of thickening agent selected from the group consisting of sodium alginate, sodium polyacrylate, ammonium, polyacrylate, methylcellulose, and hydroxyethyl cellulose.

5. A coating composition as claimed in claim 4 to which has been added up to 40% by weight, based on the total weight of copolymer solids plus epoxy component solids, of humectant film-formers selected from the group consisting of alkali-soluble, acid-precipitable isolated vegetal protein, water-soluble urea/formaldehyde resin, water soluble melamine/formaldehyde resin, water soluble aminotriazine/formaldehyde resin, water-soluble phenol/formaldehyde resin, and water-soluble urea/melamine/formaldehyde resin.

6. A coating composition as claimed in claim 3 to which has been added up to 40% by weight, based on the total weight of copolymer solids plus epoxy component solids, of humectant film-formers selected from the group consisting of alkali-soluble, acid-precipitable isolated vegetal protein, water-soluble urea/formaldehyde resin, water soluble melamine/formaldehyde resin, water soluble aminotriazine/formaldehyde resin, water-soluble phenol/formaldehyde resin, and water-soluble urea/melamine/formaldehyde resin.

7. A coating composition as claimed in claim 2 which is pigmented.

8. The method of preparing a storage-stable thermosetting emulsion coating composition which comprises the steps of: preparing an acidic latex of copolymer having a $T_1$ value between about 5° C. and 100° C. by copolymerizing at temperatures below 80° C. and in the presence of peroxidic free-radical catalyst an aqueous dispersion of mixed monomers in a continuous aqueous phase containing about 0.5–2.5% by weight of acrylamide in combination with about 0.8–3.0% of the sodium salt of dihexyl sulfosuccinate, said percentages being by weight based on the mixed monomers, said mixed monomers being selected from the group consisting of $\alpha,\beta$ unsaturated monocarboxylic acids in amounts between about 3% and 30% by weight based on the total weight of mixed monomers, balance 1–12 carbon alkyl esters of $\alpha,\beta$ unsaturated monocarboxylic acids, 1–12 carbon alkyl diesters of $\alpha,\beta$ unsaturated, $\alpha,\beta$ dicarboxylic acids, vinyl esters of hydrocarbyl monocarboxylic acids, vinyl mononuclear aromatic hydrocarbons, acrylonitrile, and acrylamide; neutralizing the carboxyl groups of said acidic copolymer and establishing an alkaline pH in the copolymer latex by adding to said latex and reacting with said carboxyl groups thereof nitrogen base material selected from the group consisting of ammonia and water-soluble organic amines; and adding to said alkaline latex from 1–20% by weight, based on the combined weight of copolymer solids plus epoxy component solids in said latex, of monomeric diepoxides of cycloaliphatic esters conforming to the formula

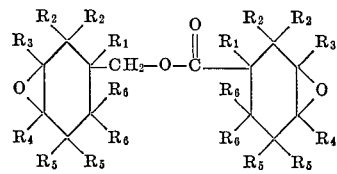

wherein $R_1$ through $R_6$ represent like and unlike members selected from the group consisting of hydrogen and lower alkyl radicals; said epoxy component of monomeric diepoxides, via the selected amount thereof, and said neutralized latex together providing epoxy groups and neutralized carboxyl groups in a molar ratio between about .5 and 1.5.

References Cited

UNITED STATES PATENTS

| | | | |
|---|---|---|---|
| 2,604,457 | 1/1952 | Segall et al. | 260—45.5 |
| 2,767,153 | 10/1956 | Sutton | 260—29.6 |
| 2,772,166 | 11/1956 | Fowler | 96—114 |
| 2,787,603 | 4/1957 | Sanders | 260—29.3 |
| 2,794,742 | 6/1957 | Fowler et al. | 96—87 |
| 2,795,564 | 6/1957 | Conn et al. | 260—29.6 |
| 2,829,069 | 4/1958 | Michel | 117—76 |
| 2,866,763 | 12/1958 | Sanders | 260—29.3 |
| 2,868,752 | 1/1959 | Frazier et al. | 260—29.6 |
| 2,872,427 | 2/1959 | Schroeder | 260—29.6 |
| 2,918,391 | 12/1959 | Hornibrook | 260—29.6 |
| 2,954,358 | 9/1960 | Huritz | 260—29.6 |
| 3,062,686 | 11/1960 | Graulick et al. | 260—29.6 |
| 2,716,123 | 8/1955 | Frostick | 260—348 |

OTHER REFERENCES

Carbide, Chemical Progress, July 1956 (pp. 1 and 8 supplied).

WILLIAM H. SHORT, Primary Examiner

M. GOLDSTEIN, Assistant Examiner

U.S. Cl. X.R.

260—17, 17.4, 29.3, 29.4, 29.6, 80.8, 844, 851, 848, 855